United States Patent [19]
Irribarren

[11] Patent Number: 5,841,966
[45] Date of Patent: Nov. 24, 1998

[54] DISTRIBUTED MESSAGING SYSTEM

[75] Inventor: Roberto Irribarren, Fremont, Calif.

[73] Assignee: Centigram Communications Corporation, San Jose, Calif.

[21] Appl. No.: 627,590

[22] Filed: Apr. 4, 1996

[51] Int. Cl.⁶ .................................................. G06F 13/14
[52] U.S. Cl. ................................ 395/200.36; 395/200.75
[58] Field of Search ........................... 395/200.3, 200.36, 395/200.37, 200.68, 200.75

[56] References Cited

U.S. PATENT DOCUMENTS

| | | | |
|---|---|---|---|
| 4,920,558 | 4/1990 | Hird | 379/67 |
| 5,524,137 | 6/1996 | Rhee | 379/67 |
| 5,539,800 | 7/1996 | Inniss | 379/67 |
| 5,619,508 | 4/1997 | Davis | 370/495 |

*Primary Examiner*—Eric Coleman
*Attorney, Agent, or Firm*—Fish & Richardson P.C.

[57] ABSTRACT

A method and system for a truly distributed messaging architecture based on existing LAN and PC technologies. A caller using one multi-media enabled PC (MPC) attempts to connect to a called MPC via a LAN or other digital data communication network. If the called MPC is in a receive mode but no one answers after a preset time, a prepared greeting message from the called MPC (e.g., an audio or audiovisual data file) is transmitted via the LAN to the calling MPC and played to the caller. The caller may then record an audio or audiovisual outgoing message for the called MPC. The outgoing message is stored in an "Outbox" for the caller, and a LAN message from the calling MPC starts a "message waiting" indicator on the called MPC. Whenever the called party is ready to receive waiting messages, that party can start an application which shows envelope information for such messages. The recipient can then retrieve any outgoing message stored in the Outbox for the calling MPC, and play back such messages. The invention can also be used for "call screening" by called parties, for sending audio or audiovisual information from a calling MPC over a LAN to many called MPCs simultaneously, and for "conference" calls.

17 Claims, 2 Drawing Sheets

DISTRIBUTED MESSAGING SYSTEM

BACKGROUND OF THE INVENTION

1. Field of the Invention

This invention relates to electronic computer communication systems, and more particularly to an electronic distributed messaging system for local area networks.

2. Description of Related Art

A computer program application currently available for the popular Windows for Workgroups operating system from Microsoft Corporation is named "CHAT". This application allows a user on one personal computer (PC) to establish a written "conversation" over a local area network (LAN) with another person by merely "dialing up" that person's PC. The CHAT application then produces a ringback tone in the caller's PC and a "ringing" telephone sound on the remote PC's speaker. If the user at the remote PC answers, the caller's PC screen switches into a split screen (or two windows). This allows the caller to type any text into an "out" window or screen and have that text displayed on the called party's "in" window or screen, while the called party's outgoing text is displayed in the caller's "in" window or screen. The character-based CHAT program also has a behavior that allows "non-realtime" communication. If the called party does not answer, it is still possible for the caller to type a message directed to the caller's "out" screen. The ringing tone will continue until answered on the remote PC (or until the call times out). If the call is answered before timing out, the typed text is transferred at once and appears on the screen of the called PC.

A problem of the prior art CHAT program is that it is limited to text messages. Accordingly, it would be desirable it some means existed for providing functionality similar to the CHAT program except with the ability to communicate audio or audiovisual messages. The present invention provides such a capability.

SUMMARY OF THE INVENTION

With the proliferation of multimedia-ready PC's, faster local area network (LAN) transports, and an increased awareness of complete messaging integration, it is now not only feasible to use the underlying LAN services in order to perform simple non-realtime applications, but also real-time telephone, voice, and video applications. The present invention provides a method and system for a truly distributed messaging architecture based on existing LAN and PC technologies.

In the preferred embodiment of the present invention, a caller using one multi-media enabled PC (MPC) attempts to connect to a called MPC via a LAN or other digital data communication network. In the preferred embodiment, if the called MPC is in a receive mode but no one answers after a preset time, a prepared greeting message from the called MPC (e.g., an audio or audiovisual data file) is transmitted via the LAN to the calling MPC and played to the caller. The caller may then record an outgoing message for the called MPC. The outgoing message may be purely audio, or may be an audiovisual (still or video) message. The outgoing message may then be stored in an "Outbox" for the caller. Once the outgoing message is finished and stored, a LAN message from the calling MPC can start up a "message waiting" indicator on the called MPC. In the preferred embodiment, the network mail system appends or associates "envelope" information (e.g., message source, length, time of creation, etc.) for the message waiting indicator. If the called MPC is not in a receive mode, the message waiting indicator can be stored in the mail system of a network server and transmitted to the called MPC when that MPC can receive messages.

In the preferred embodiment, whenever the called party is ready to receive waiting messages, that party can start an application which shows envelope information for such messages. The recipient can then retrieve any outgoing message stored in the Outbox for the calling MPC, and play back such messages.

Another aspect of the invention is that it can be used for "call screening" by called parties. Another aspect of the invention is that it can be used for sending audio or audiovisual information from a calling MPC over a LAN to many called MPCs simultaneously, and for conference calls. Yet another aspect of the invention is that a user profile can be defined that automatically performs specific actions based on characteristics (e.g., caller, time, date, etc.) of an incoming message (for example, a message from a specific caller occurring after work hours may be forwarded to another MPC).

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 1:
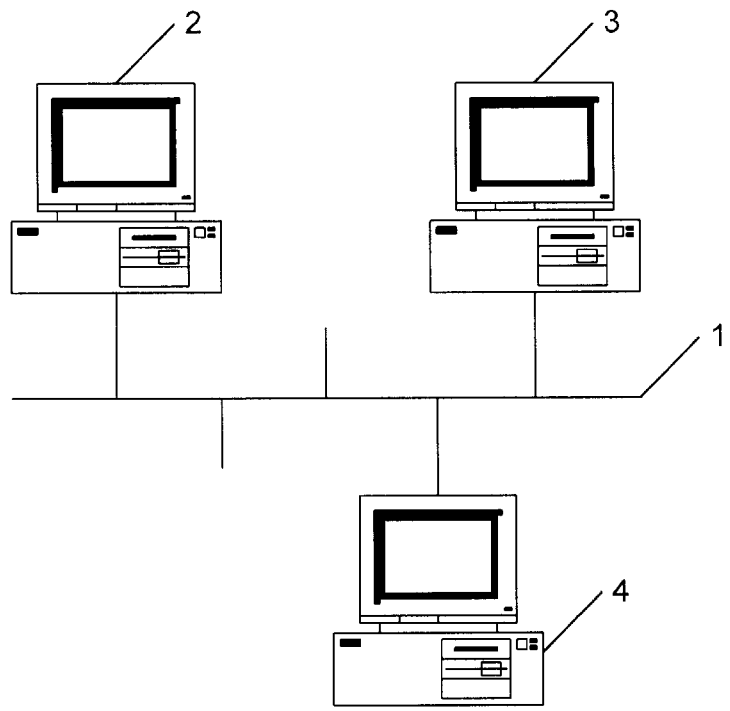
FIG. 1 is a block diagram of a conventional prior art local area network (LAN) system coupling several multi-media enabled personal computers (MPCs).

FIG. 1 is a block diagram of a conventional prior art local area network (LAN) system 1 coupling several multi-media enabled personal computers (MPCs) 2, 3, 4. The LAN 1 should be of the type having messaging capability for transmitting messages between MPCs; file transmission capability for transmitting files between MPCs (i.e., peer to peer capability); and interim message and file storage, for storage of messages and files that cannot be delivered immediately.

The MPCs 2, 3, 4 themselves need not be all of the same type, and may run different operating systems, so long as they are configured to pass data files between each other and have a user-interface or program capable of interpreting and playing audio and/or audiovisual data files. For example, the MPCs 2, 3, 4 may include UNIX-based workstations, Apple Macintosh computers, and/or DOS or Windows-based computers.

A network server (not shown) may be present in a server-based network, but is optional in a peer-to-peer network. Such a server, if accessible by all of the MPCs 2, 3, 4, is useful for providing interim storage of undelivered messages, logging messages, and backing up messages. Such a server can also provide "gateway" services by allowing MPCs to make calls to and receive calls from other networks through public or private telephone networks. However, the invention is not limited to a client/server type of architecture.

Figure 2:
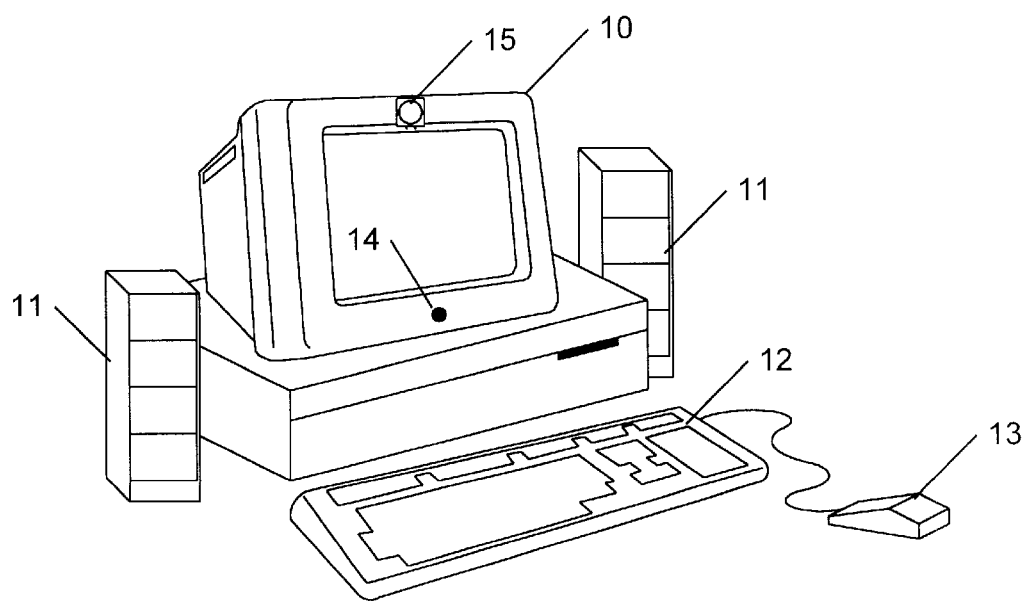
FIG. 2 is an enlarged diagram of a typical prior art MPC.

FIG. 2 is an enlarged diagram of a typical prior art MPC equipped with a video monitor 10 as one output device, speakers 11 as another output device, a keyboard 12 and mouse 13 as manual input devices, a microphone 14 as another input device, and an optional video camera 15 as yet another input device. The video camera 15 may also be used to take still images, as is known in the art. Each MPC 2, 3, 4 at least should be able to provide real-time playback of audio data files received over the LAN 1. Most present multimedia PCs can meet this requirement.

Figure 3:
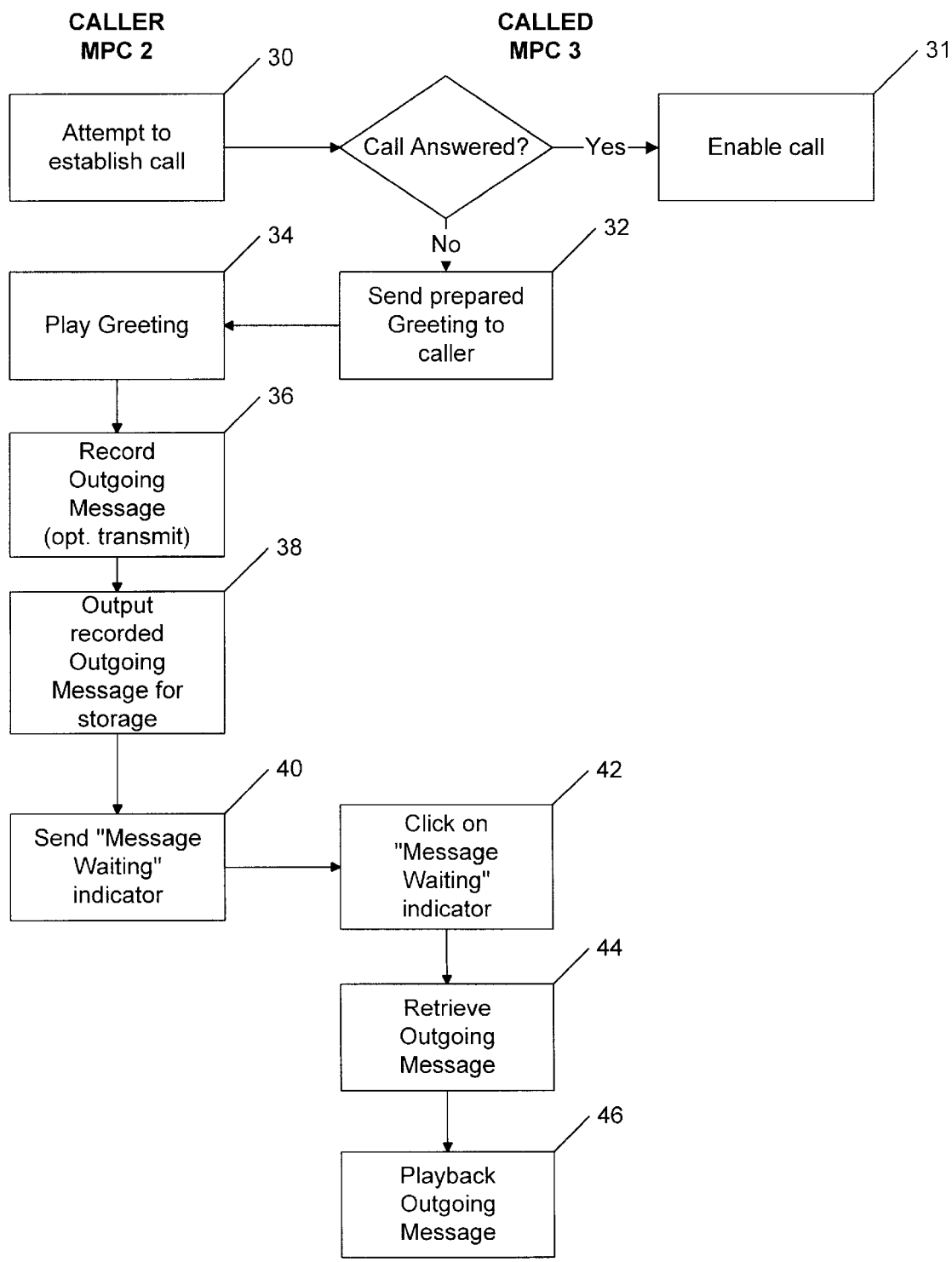
FIG. 3 is a flowchart showing the preferred steps of the present invention.

FIG. 3 is a flowchart showing the preferred steps of the invention. In the preferred embodiment of the present invention, a caller using one MPC 2 attempts to connect to a called MPC 3 via the LAN 1 (Step 30). In the preferred embodiment, if the called MPC 3 is in a receive mode and the called party answers, a real-time or near real-time audio or audiovisual conference can be held (Step 31). However, if the called MPC 3 is in a receive mode but no one answers the called MPC 3 after a preset time, a prepared greeting message from the called MPC 3 (e.g., an audio or audiovisual data file) is transmitted via the LAN to the calling MPC 2 (Step 32) and played to the caller (Step 34). One purpose of the greeting is to inform the calling party that the called party is unavailable.

In an alternative embodiment, if no one answers the called MPC 3 after a preset time, or the called user has set a "do not disturb" flag (for example, by clicking on an icon in the application implementing the invention), or the LAN 1 or called MPC 3 indicate in any fashion that messages cannot be received by the called MPC 3 (for example, where the called MPC 3 is turned off), a simple greeting signal or message, such as a "busy" tone or icon or dialog, can be transmitted to the calling MPC 2 by the called MPC 3 or by the network server. Again, such a greeting message or signal indicates that the called party is unavailable.

After receiving an indication that direct messages will not or cannot be received by the called MPC 3, the caller may then record an outgoing message for the called MPC 3 using the microphone 14 and/or video camera 15 of the caller's MPC 2 (Step 36). (In this context, "record" includes accepting audio and/or video input, and is not limited to "make a permanent or semi-permanent record of" as in tape storage). The outgoing message may be purely audio, or may be an audiovisual (still or video) message. (In an alternative embodiment, the caller may pre-record the outgoing message before attempting to establish a call). The outgoing message may then be stored in an "Outbox" for the caller, which may be located in the calling MPC 2, or transferred via the LAN 1 to a network server or to the called MPC 3 for storage (Step 38). In a manner similar to electronic mail applications, outgoing messages could be marked as "Private", "Urgent", "Return Receipt", and/or "Future Delivery".

In the preferred embodiment, outgoing audio messages are recorded in a standard format (such as the Microsoft Windows WAV format, the Apple Macintosh AIFF format, or the Sun Microsystem AU format). Similarly, outgoing audiovisual messages are recorded in a standard format (such as the Microsoft Windows AVI wave format). The only requirement for a minimum system is that a called MPC have a suitable program (such as a multimedia "browser" similar to the MOSAIC program for Internet files) capable of interpreting and playing audio and/or audiovisual data files recorded on the calling MPC.

Further, in the preferred embodiment, files (such as word processing, database, spreadsheet, graphics, etc.) can be associated with the outgoing message as an attachment, in known fashion. This allows a calling party to provide a file to a called party along with a voice or audiovisual explanatory message.

Once the outgoing message is finished and stored, a LAN message from the calling MPC 2 can start up a "message waiting" indicator (e.g., an icon, audible beep, blinking attribute, pager signal, etc.) on the called MPC 3 (Step 40). In the preferred embodiment, the network mail system appends or associates "envelope" information (e.g., message source, length, time of creation, etc.) for the message waiting indicator. If the called MPC 3 is not in a receive mode, the message waiting indicator can be stored in the mail system of the network server and transmitted to the called MPC 3 when that MPC 3 can receive messages.

In the preferred embodiment, whenever the called party is ready to receive a waiting message, that party can use a mouse 13 to click or double-click on the message waiting icon on the called MPC 3. This event causes the MPC 3 to run an application (e.g., similar in user interface to an electronic mail-type application) which shows the envelope information for that waiting message (Step 42). Alternatively, such envelope information for all waiting messages may be automatically shown, allowing the called party to choose which to play first. As another alternative, the application may include a text to speech function that converts text to speech and thus "reads" a message audibly to the called party.

If the recipient clicks or double-clicks on a message indicator, the playback application retrieves the outgoing message stored in the Outbox for the calling MPC 2 (Step 44). This may be done by connecting to a peer application in the calling MPC 2 (or starting one if one is not running) and retrieving the outgoing message from local storage within the calling MPC 2. This configuration allows for easy implementation of a "Return Receipt" notification to the calling MPC 2, since any access to a stored message within the calling MPC 2 can easily be detected and logged.

Alternatively, retrieval may be accomplished by requesting the outgoing message from an Outbox controlled by the network server. This configuration allows for the caller to store the outgoing messages in a centralized LAN 1 storage location (such as a File and Print LAN server, or alternatively a Voice/Fax/Data server), so that the calling MPC 2 does not have to be on at all times.

As yet another alternative, retrieval may also be accomplished by accessing local storage in the called MPC 3 if the calling MPC 2 originally created a temporary Outbox within the called MPC 3. Retrieval of the outgoing message may trigger a "Return Receipt" response to the calling MPC 2 if one was specified, in known fashion.

Upon retrieval of an outgoing message, the message is played back over the called MPC's 3 speakers 11 (and video monitor 10 if the message audiovisual), preferably using conventional playback techniques for the specific data format (Step 46).

Another aspect of the invention is that it can be used for "call screening" by called parties. For example, since the called MPC's 3 message playback application can handle real-time voice playback over the LAN 1, a "do not disturb" status can be indicated by a user. If an incoming call is attempted and refused, it is possible to transmit the calling party's outgoing message over the LAN 1, while it is being recorded, for essentially simultaneous transmission to and playback on the called MPC's 3 speakers 11. This now allows call screening (an answering machine function long lost after voice mail implementation), since the recipient can hear the recording essentially in real-time and can thus still answer the call before the calling party "hangs up". In this embodiment, the recording is optionally transmitted to the called MPC 3, as indicated in Step 36 of FIG. 3.

If the called party is actually using the called MPC 3 when a "screened" call comes in, the called party can answer the call before the calling party disconnects. For example, the called party can say "hello" and have that message locally recorded as an audio file for transmission over the LAN 1 back to the calling party. That reply recording can then be played essentially in real-time on the calling MPC's 2 speakers 11, thus allowing a two-way conversation between the parties. Because of a limitation of many of today's sound cards, it is usually not yet to be able to record and playback voice at the same time. This means that, for present conventional audio cards, an audio conversation would have to be half-duplex (very much like an intercom, forcing each talker to push a "talk" button). However, this limitation has been overcome by some audio cards with the advent of new software drivers, thus allowing full-duplex conversations over a LAN 1.

Another aspect of the invention is that it can be used for sending audio or audiovisual information from a calling MPC 2 over a LAN 1 to many called MPCs 3, 4 simultaneously. This allows the invention to be used to page a party through multiple MPCs at once or provide an inexpensive PA system, along with similar uses. All that need exist for such calls is a "phone book" of recipients, each of whom receives the recorded message. Such a call may be "broadcast" to essentially all entries in the phone book, or "multicast" to selected entries in the phone book.

Another aspect of the invention is that it can be used for conference calls by allowing a called party or the calling party to add one or more additional parties to a conversation. Again, all that need exist for such calls is a "phone book" of recipients, each of whom receives each recorded message.

Yet another aspect of the invention is that a user profile can be defined that automatically performs specific actions based on characteristics (e.g., caller, time, date, etc.) of an incoming message (for example, a message from a specific caller occurring after work hours may be forwarded to another MPC), similar to "rules" macros available in such electronic mail products as Lotus cc:Mail.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, while personal computers have been used to illustrate the invention, the invention applies to workstations, diskless PCs, network terminals, and similar computer terminals. Accordingly, it is to be understood that the invention is not to be limited by the specific illustrated embodiment, but only by the scope of the appended claims.

What is claimed is:

1. A method for distributing messages over a local area network coupling a plurality of computer terminals, comprising the steps of:

(a) attempting to initiate a message session from a calling party using a calling computer terminal with at least one called party using at least one corresponding called computer terminal;

(b) whenever such attempt fails, then generating a greeting message associated with each called computer terminal for the calling computer terminal indicating that the corresponding called party is not responding;

(c) recording an outgoing message by the calling party to each called party, the message comprising one of an audio or audiovisual message;

(d) storing the outgoing message in an outbox associated with the calling computer terminal;

(e) generating envelope information including identification data indicating the calling party recorded the outgoing message;

(f) storing the envelope information in the outbox associated with the calling computer terminal;

(g) associating the envelope with a message waiting indicator, where the message waiting indicator indicates the presence of the envelope information and the outgoing message in the outbox and is selectable to cause the envelope information to be retrieved from the outbox and to cause the outgoing message to be retrieved from the outbox;

(h) activating the message waiting indicator at the called computer terminal when the called computer terminal is enabled to receive messages;

(i) in response to activating the message waiting indicator selected to retrieve the envelope information, retrieving the envelope information from the outbox to each called computer terminal;

(j) upon such envelope information retrieval displaying the envelope information on each called computer terminal;

(k) in response to activating the message waiting indicator selected to retrieve the outgoing message, retrieving the outgoing message from the outbox to each called computer terminal;

(l) upon such outgoing message retrieval, playing the retrieved outgoing message back on each called computer terminal.

2. The method of claim 1, wherein each greeting message is one of an audio or audiovisual message.

3. The method of claim 1, wherein each greeting message is stored as a conventional audio data file.

4. The method of claim 1, wherein each greeting message is stored as a conventional audiovisual data file.

5. The method of claim 1, wherein each greeting message is generated only after a preset time elapses after an attempt is made to initiate a message session from a calling party with at least one called party.

6. The method of claim 1, wherein the outgoing message is stored as a conventional audio data file.

7. The method of claim 1, wherein the outgoing message is stored as a conventional audiovisual data file.

8. The method of claim 1, wherein the outgoing message is pre-recorded before attempting to initiate a message session from a calling party with at least one called party.

9. The method of claim 1, wherein the outgoing message includes attached data files.

10. The method of claim 1, wherein the outbox is located within the calling computer terminal.

11. The method of claim 1, wherein the outbox is located within each called computer terminal.

12. The method of claim 1, wherein the outbox is located within a network server coupled to the digital data communication network.

13. The method of claim 1, further including the step of:
   (a) if the attempted message session is initiated, enabling each called party to converse with the calling party.

14. The method of claim 13, wherein such conversation is conducted essentially in real-time.

15. The method of claim 1, further including the steps of:
   (a) if the attempted message session is initiated, enabling each called party to converse with the calling party; and
   (b) enabling at least one of the calling party and at least one called party to establish a conference call with another party.

16. The method of claim 1, further including the steps of:
   (a) transmitting the outgoing message to each called computer terminal, essentially simultaneously with recording of such message;
   (b) playing the outgoing message back on each enabled called computer terminal;
   (c) enabling each called party to screen the outgoing message and selectively establish a completed call with the calling party, thereby enabling each called party to converse with the calling party.

17. A method for distributing messages over a local area network coupling a plurality of computer terminals, comprising the steps of:
   (a) attempting to initiate a message session from a calling party using a calling computer terminal with at least one called party using at least one corresponding called computer terminal;
   (b) whenever such attempt fails, then generating a greeting message associated with each called computer terminal for the calling computer terminal indicating that the corresponding called party is not responding;
   (c) recording an outgoing message by the calling party to each called party, the message comprising one of an audio or audiovisual message;
   (d) transmitting the outgoing message to each called computer terminal;
   (e) playing the retrieved outgoing message back on each enabled called computer terminal;
   (f) enabling each called party to screen the played outgoing message and respond to the calling party.

* * * * *